E. O. BARTLETT.
MANUFACTURE OF DRY WHITE LEAD.
No. 100,353.  Patented Mar. 1, 1870.
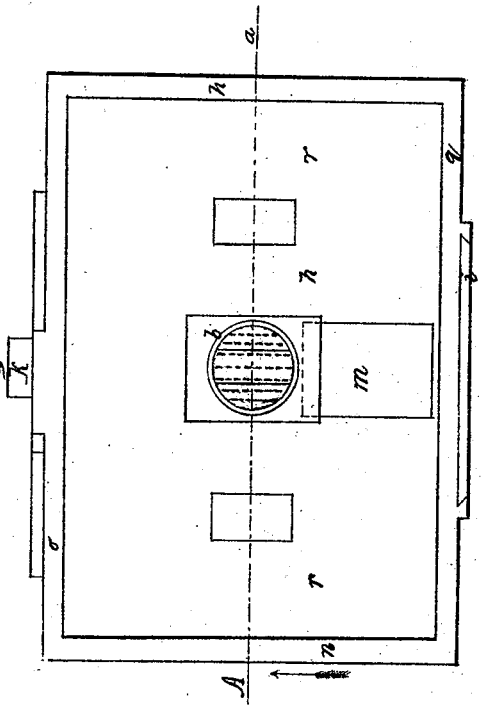
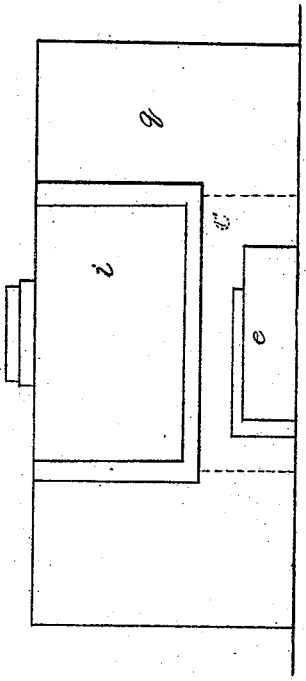
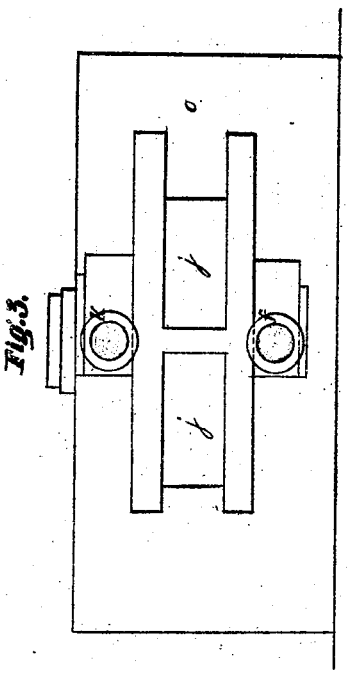
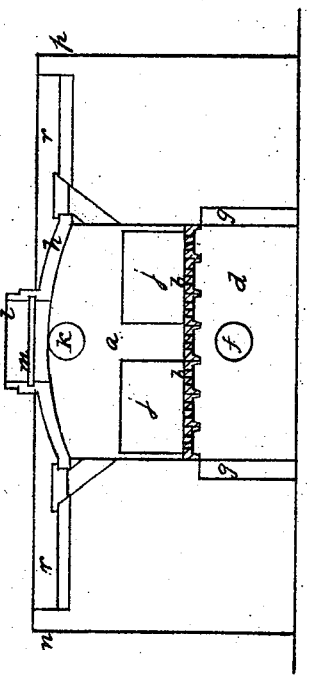

United States Patent Office.

EAYRE O. BARTLETT, OF BIRMINGHAM, PENNSYLVANIA.

Letters Patent No. 100,353, dated March 1, 1870.

---

IMPROVEMENT IN THE MANUFACTURE OF DRY WHITE LEAD.

---

The Schedule referred to in these Letters Patent and making part of the same.

---

To all whom it may concern:

Be it known that I, EAYRE O. BARTLETT, of Birmingham, in Woorsmark township, Huntington county, Pennsylvania, have invented a new and useful Improvement in the Manufacture of Dry White Lead and white-lead pigment from galena, (native sulphuret of lead;) and I do hereby declare that the following is a full and exact description of the same.

Heretofore dry white lead or the basis of white lead pigment has been made from metallic lead by the use of acid.

When galena (native sulphuret of lead) has been used it has been first reduced to metallic lead.

The process most generally pursued in making dry white lead, or the basis of white-lead pigment, from metallic lead, is by the use of acetic acid in earthen vessels immersed in decomposing matter, such as dung or tan.

This treatment requires from five to twelve weeks.

The lead is then ground, washed, and dried before it is fit to be used as a basis of a pigment.

I have discovered that by treating the ordinary galena, (native sulphuret of lead,) in an ore-crusher, and then roasting it in an ordinary desulphurizing kiln or oven, and then mixing it with carbon, preferably in the state of fine-washed pea or dust anthracite coal, in the proportion of half and half, and then heating the mixture in a compound reducing and oxidizing furnace, dense white fumes or vapors pass off. These are conveyed into a separate chamber or receptacle, where the vapors are strained by passing through bags or screens of muslin, or other fabric, or are allowed to deposit by being passed slowly through an extended chamber in the way in which lampblack, oxide of zinc, &c., have been heretofore collected.

To prevent the fluxing of the mass together and otherwise to facilitate the subsequent operations, caustic lime or the carbonate of lime (in the form of pulverized limestone or otherwise) may be added to the mixture of carbon, and roasted ore in the proportion of about two hundred pounds of lime to every four hundred pounds of the galena. This addition is not essential, although under some circumstances it is desirable and beneficial.

I find that lead in this condition will form, when mixed with oil, a superior white pigment. It differs from and is superior in quality as a pigment to the white oxide of zinc, or anything heretofore produced from mixed metallic ores.

The product obtained by my said process may be used not only as the basis of pigment, but as a drier, and in all manufactures where pure white oxide of lead is desired.

The furnace which I have found to work well for the purposes above mentioned is commonly known as the Wetherell zinc furnace, for which Letters Patent of the United States were granted to Samuel Wetherell, November 13, 1855, No. 13,806, and which is represented in the annexed drawings, in which—

$a$ is the main chamber, the bottom $b$ of which is composed of iron bars, perforated with small holes of about one-quarter of an inch in diameter, and about one inch apart, and preferably made slightly conical with the larger diameter downward.

The size of the holes would be such as to prevent the crushed ore and coal from falling through. These perforated bars are suitably sustained at the ends on the front and back walls $c\ d$.

The ash-pit below the perforated bottom is of equal area therewith, and is provided with a door, $e$, in front, and with a hole, $f$, at the back, for the reception of a pipe from suitable blowing apparatus.

The walls $g\ g$ and arch or top $h$ should be built of some refractory substance, such as fire-brick.

The front is entirely open, and provided with sliding doors $i$, by which it can be closed when working the process or open to remove the residuum.

And at the back there are two sliding jambs $j\ j$, to give access to the main chamber for stirring the charge and for inspection.

At the back near the arch there is a hole, $k$, governed by a sliding damper, leading to a chimney for carrying off smoke and impure gases in the beginning of the operation on a new charge.

In the center of the roof there is an aperture, $l$, governed by a damper or sliding door, $m$, leading to a suitable apparatus for the collection of the oxidized vapors of lead.

The exterior walls $n\ o\ p\ q$ may be built above the top to form two feeding troughs, $r\ r$, one on each side of the arch or roof, and provided each with an aperture or passage, $s$, leading to the inside or main chamber, and each aperture or passage is provided with a cover to be put on after the furnace has been charged.

Having thus described my invention,

I claim, and desire to secure by Letters Patent—

1. The manufacture of the basis of a pigment, by treating galena (native sulphuret of lead,) by roasting and afterward mixing the roasted mass with carbon, and subjecting it to the action of heat in a compound reducing and oxidizing furnace, and collecting the fumes, as above described 2. The employment of lime in the form of caustic lime, or the carbonate of lime, in combination with roasted galena and carbon in a compound reducing and oxidizing furnace, substantially as described.

3. Roasting galena, (native sulphuret of lead,) and then subliming the same, and oxidizing the vapors, and collecting them as formed in a separate chamber, for the purpose of forming a basis of pigment and for other purposes, substantially as set forth.

4. As a new manufacture, a white oxide of lead, produced by roasting the galena, then subliming and oxidizing the same, and collecting it in a separate chamber.

EAYRE O. BARTLETT.

Witnesses:
GEORGE E. BUCKLEY,
W. A. A. MCKINLEY.